H. BAILEY.
DUMPING-WAGON.
No. 6,783. Reissued Dec. 7, 1875.
*Fig. 1.*
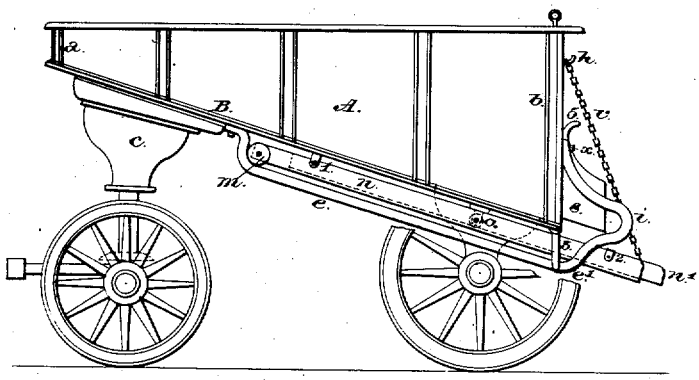
*Fig. 2.*
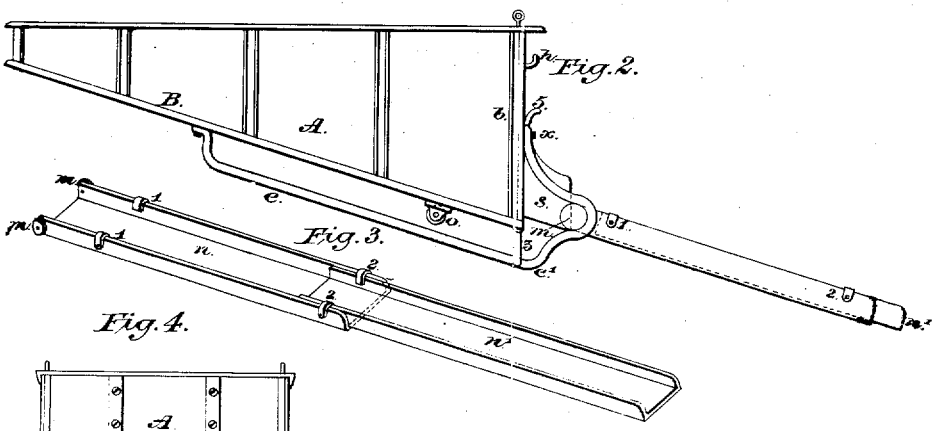
*Fig. 3.*
*Fig. 4.*
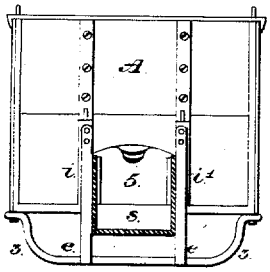
*Fig. 5.*
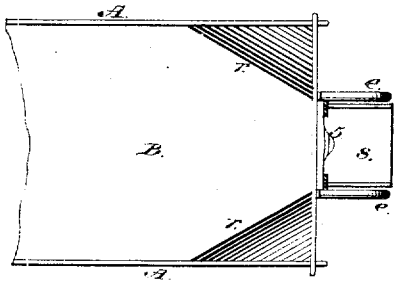
*Attest:*
Theophilus Weaver
Daniel A. Kefner
*Inventor:*
Hamilton Bailey

UNITED STATES PATENT OFFICE.

HAMILTON BAILEY, OF HARRISBURG, PENNSYLVANIA.

IMPROVEMENT IN DUMPING-WAGONS.

Specification forming part of Letters Patent No. 147,468, dated February 17, 1874; reissue No. 6,783, dated December 7, 1875; application filed September 10, 1875.

*To all whom it may concern:*

Be it known that I, HAMILTON BAILEY, of city of Harrisburg, in the county of Dauphin and State of Pennsylvania, have invented certain new and useful Improvements in Dumping-Wagons; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The nature and objects of my invention are declared as follows: First, a conveyance on wheels, adapted to deliver coal properly into cellars or other places more or less remote from the vehicle, usually stationed outside the sidewalk, by the employment of a bed having a rearwardly-inclined bottom, in combination with one or more extension chute-sections, likewise inclined and definitely or positively attached to each other, as an adjunct of the conveyance. Second, certain stirrups or hangers for the extension-chute sections, arranged beneath the bed of the vehicle, to correctly hold the front chute-section in communication with the discharge-spout of the vehicle, and to hold, also, the same in folded condition when the vehicle is moving.

In the accompanying drawings, Figure 1 represents a side elevation of the wagon in perspective. Fig. 2 is a side view of the body or bed, showing the extension-chute partially extended. Fig. 3 is a perspective view, showing the extension-chute fixture detached from the vehicle and its sections fully extended. Fig. 4 is a rear-end view of the vehicle-bed. Fig. 5 is a top view of the vehicle-bed.

Like references refer to similar parts.

A represents the vehicle-bed, made with horizontal top, and rearwardly-sloped bottom, with sufficient down-grade to run nut-coal therefrom by the act of gravity, when the slide 5 is opened. To avoid lodgments of coal in the rear corners of the bed, the triangular turn-outs *r r* are employed to direct the coal to the exit. Beneath the bed-bottom, and parallel therewith, are attached thereto the guides *e e'*, also parallel with each other and similar, properly distanced from each other, to receive on them, as ways, the rollers *m m*, or simply lugs or clips instead thereof, when friction is disregarded. Said guides are curved and located as shown, that the extension chute-sections *n n'* may be readily shifted to their place of retreat under the bed, where they may be securely transported. The rods constituting the guides *e e' e e'* are continued to the rear of the bed, making the detours or return loops shown between the points *e* and *x*, where they are fixedly attached to the bed.

The object of this construction is to allow the travelers *m m* to pass the front end of section *n* into governed position or application beneath the spout *s*, so that communication from the latter to the former is rendered certain; and communication from section *n* to section *n'* is likewise certain, because said sections are combined with each other as slip-joints, the clips 1 2 serving to guide and align them to each other.

The guides *e e' e e'* are, moreover, transversely connected, as shown in Fig. 4, at a point indicated by numeral 3, Fig. 2, directly beneath the rear end of the bed, and braces 3 3 serve to stay the rod-structure firmly in position. A stirrup is thus formed by said transverse connection, on which the rear ends of the folded chutes are supported, their front ends being upheld by the parts *m m* on the guides *e e' e e'*, as shown in Fig. 1.

It may be observed that the chute-fixture is thus positively and definitely connected with the vehicle by a species of long link and button connection, for the rollers *m m*, or lugs or studs that may be employed in lieu thereof, do not allow the chute-sections to become disengaged from the guide-structure *e e' e e'* by illicit shifting or accidental jostling.

The chute-sections *n n'* may be any number, made trough form, and so graded that the section next the vehicle-bed may enter as a slip-joint into the next section, loosely, and be connected therewith by clips 1 2, made hook form, or simply of straps turned inward to overlap and embrace the adjacent edges, and located to attain the full extension of the sections *n n'*, as shown in Fig. 3, and when fully extended, a shoulder or stop is provided to prevent the complete withdrawal of section *n'* from section *n*. An elastic roller *o* is also shown in Figs. 1 and 2, designed to sensitively hold the chute-sections muffled in their retreat by pressing on them. A chain, *v*, attached, as shown, is also used to hold the chute-sections *n n'* fully sheathed and taut against the said roller *o*.

The rear wall of the bed A is transversely divided into two nearly-equal sections—the upper section being hinged to the lower section, as shown in Fig. 4.

The object of this construction is to facilitate loading, as the upper section may be laid down outward, to lessen the height of the rear end of the cart, coal being usually shoveled into the bed from a place at its rear.

The method of operating my vehicle is as follows: It being loaded and run to the desired place, the extensible chute is drawn from its retreat beneath the bed, and its unsupported end located at a window, doorway, or vault-opening, as the case may be. The slide 5 then being opened, the coal will be impelled by gravity to discharge itself to the place desired, thus avoiding much obstruction to travel, and leaving few traces of coal on the sidewalk.

What I regard as new and useful in my invention, and what I desire to secure by a reissue of my Letters Patent of the United States is embraced in the following:

1. The coal-vehicle bed A B, in combination with one or more extensible chute-sections, *n n'*, to supplement the discharge-spout *s*, when said sections are connectedly applied thereto as a suitable adjunct of the vehicle, and so arranged that the act of extending the sections *n n'* to the rear will secure the correct application of section *n* beneath the spout *s*, substantially as and for the purpose set forth.

2. In a coal-vehicle, having bed A, with rearward-inclined bottom B, a stirrup or hanger arranged beneath the bed, as a support and carrier for the extensible chute device, substantially as set forth.

3. In a coal-vehicle, the parallel guides *e e' e e'* arranged beneath the bed A, in combination with the extensible chute *n n'*, when the latter is provided with the suspension-points *m m*, substantially as set forth.

In testimony that I claim the foregoing I have hereunto set my hand this 8th day of September, 1875.

HAMILTON BAILEY.

Witnesses:
THEOPHILUS WEAVER,
DANIEL A. KEPNER.